United States Patent
Lee et al.

(10) Patent No.: US 9,570,038 B2
(45) Date of Patent: Feb. 14, 2017

(54) MOBILE DEVICE AND CONTROL METHOD THEREOF

(71) Applicant: Samsung Electronics Co., Ltd., Suwon-si, Gyeonggi-do (KR)

(72) Inventors: Jungwoo Lee, Suwon-si (KR); Sejun Song, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 98 days.

(21) Appl. No.: 14/539,505

(22) Filed: Nov. 12, 2014

(65) Prior Publication Data
US 2015/0154936 A1    Jun. 4, 2015

(30) Foreign Application Priority Data
Dec. 2, 2013  (KR) ......................... 10-2013-0148318

(51) Int. Cl.
| | | |
|---|---|---|
| G09G 5/00 | (2006.01) | |
| G06F 3/041 | (2006.01) | |
| G06F 1/16 | (2006.01) | |
| G06F 3/14 | (2006.01) | |
| G06F 3/147 | (2006.01) | |

(52) U.S. Cl.
CPC .............. *G09G 5/006* (2013.01); *G06F 1/1652* (2013.01); *G06F 3/0416* (2013.01); *G06F 3/147* (2013.01); *G06F 3/1423* (2013.01); G09G 2330/02 (2013.01); G09G 2340/14 (2013.01); G09G 2354/00 (2013.01); G09G 2380/02 (2013.01); G09G 2380/14 (2013.01)

(58) Field of Classification Search
CPC ............................... G06F 1/163; G06F 1/1652
See application file for complete search history.

(56) References Cited

U.S. PATENT DOCUMENTS

| | | | | |
|---|---|---|---|---|
| 9,007,319 | B2* | 4/2015 | Lee | ......................... G06F 3/041 345/173 |
| 9,235,290 | B2* | 1/2016 | Lee | ........................ G06F 3/0416 |
| 9,288,836 | B1* | 3/2016 | Clement | ............... H04W 84/18 |
| 2007/0241150 | A1* | 10/2007 | Meyer | .................. A44C 5/0015 224/219 |
| 2008/0291225 | A1* | 11/2008 | Arneson | ................. G06F 3/011 345/698 |
| 2012/0206319 | A1* | 8/2012 | Lucero | ............... H04N 21/4788 345/1.3 |
| 2012/0242596 | A1* | 9/2012 | Sip | ...................... G06F 3/04883 345/173 |
| 2013/0044215 | A1 | 2/2013 | Rothkopf et al. | |

(Continued)

FOREIGN PATENT DOCUMENTS

KR    10-1240724 B1    2/2013

*Primary Examiner* — Dorothy Harris
(74) *Attorney, Agent, or Firm* — Jefferson IP Law, LLP

(57) ABSTRACT

A mobile device and a method for controlling the mobile device are provided. The mobile device includes a flexible display unit that has a first longitudinal edge and a second longitudinal edge and is configured to be wound in spiral turns and thereby to create at least two display regions with respect to a boundary between the first longitudinal edge in one turn and the second longitudinal edge in a next turn. The mobile device further includes a sensor unit configured to sense the boundary and to determine a display region, and a control unit configured to control the determined display region.

18 Claims, 13 Drawing Sheets

(56) References Cited

U.S. PATENT DOCUMENTS

| | | |
|---|---|---|
| 2013/0222207 A1 | 8/2013 | Baek |
| 2013/0222270 A1* | 8/2013 | Winkler .............. H04M 1/0233 345/173 |
| 2013/0271389 A1* | 10/2013 | Lyons .................. G04G 17/083 345/173 |
| 2014/0002419 A1* | 1/2014 | Thorson ................. G06F 3/147 345/175 |
| 2014/0098037 A1* | 4/2014 | Lee ......................... G06F 3/041 345/173 |
| 2014/0125604 A1* | 5/2014 | Lee ....................... G06F 3/0416 345/173 |

* cited by examiner

[310]

[320]

[410]

[420]

(510)

(520)

(530)

[610]

[620]

[920]

[910]

MOBILE DEVICE AND CONTROL METHOD THEREOF

CROSS-REFERENCE TO RELATED APPLICATION

This application claims the benefit under 35 U.S.C. §119 (a) of a Korean patent application filed on Dec. 2, 2013 in the Korean Intellectual Property Office and assigned Serial number 10-2013-0148318, the entire disclosure of which is hereby incorporated by reference.

TECHNICAL FIELD

The present disclosure relates to a technique to control a screen of a flexible display.

BACKGROUND

Nowadays touch input technology has been widely used as one of major input mechanisms for electronic devices. Touch input technology is based on an integrated form of a display manner and an input manner. This is suitable for a recent trend toward portability and a user-friendly interface of electronic devices. Further, this is convenient for users to simultaneously perform seeing and inputting.

Meanwhile, a flexible display using flexible material has been developed for electronic devices. The flexible display is adapted to be attached onto a portion of a user's body, such as wrist or arm, having curvature. Thus, the flexible display is useful to various kinds of wearable devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile device, together with a control method thereof, which may obtain a larger display size without any deterioration of usability.

In accordance with an aspect of the present disclosure, a mobile device is provided. The mobile device includes a flexible display unit, a sensor unit, and a control unit. The flexible display unit has a first longitudinal edge and a second longitudinal edge and is configured to be wound in spiral turns and thereby create at least two display regions with respect to a boundary between the first longitudinal edge in one turn and the second longitudinal edge in a next turn. The sensor unit is configured to sense the boundary and to determine a display region. The control unit is configured to control the determined display region.

In accordance with another aspect of the present disclosure, a method for controlling a mobile device is provided. The method includes creating, when a flexible display unit having a first longitudinal edge and a second longitudinal edge is wound in spiral turns, at least two display regions with respect to a boundary between the first longitudinal edge in one turn and the second longitudinal edge in a next turn, sensing the boundary and determining a display region through a sensor unit, and controlling the determined display region.

In accordance with another aspect of the present disclosure, a mobile device is provided. The mobile device including a flexible display configured to form a display region upon a first longitudinal edge and a second longitudinal edge of the flexible display unit meeting when the flexible display unit is wound in a spiral pattern, a sensor configured to sense a largest display region from an area of the first longitudinal edge and the second longitudinal edge of the flexible display unit, and a control unit configured to control the sensed largest display region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
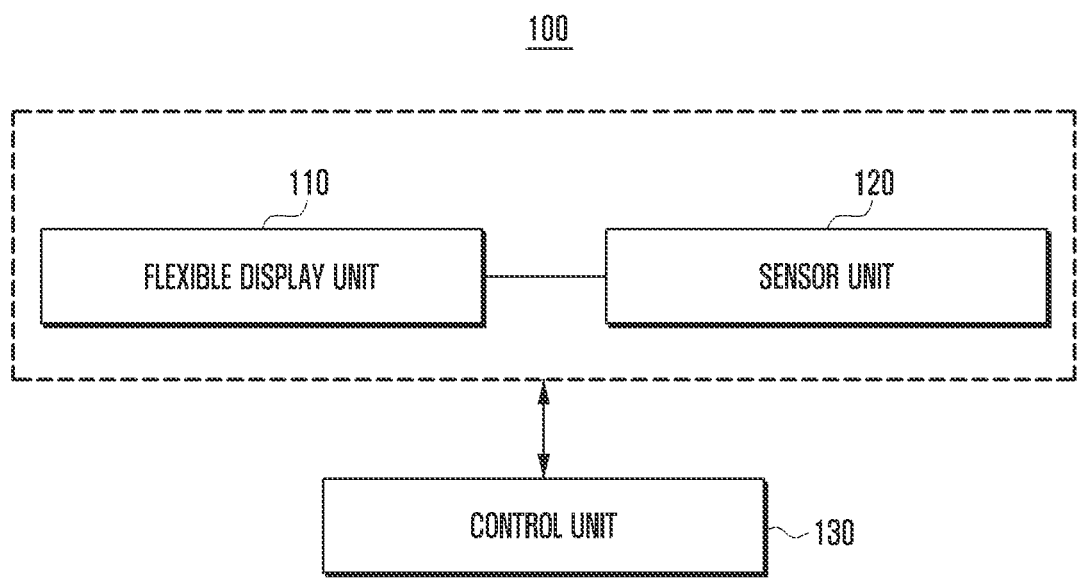
FIG. 1 is a block diagram illustrating a mobile device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a signal" includes reference to one or more of such signals.

In the present disclosure, a user interface apparatus configured for a multi-window may be included in an electronic device, which may involve a communication function. For example, an electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a portable medical device, a digital camera, or a wearable device (e.g., a Head-Mounted Device (HMD) such as electronic glasses, electronic clothes, an electronic bracelet, an electronic necklace, an electronic appcessory, or a smart watch). According to some embodiments of the present disclosure, an electronic device may be a smart home appliance that involves a communication function. For example, an electronic device may be a Television (TV), a Digital Video Disk (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame. According to some embodiments, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), a Flight Data Recorder (FDR), a car infotainment device, electronic equipment for ship (e.g., a marine navigation system, a gyrocompass, etc.), avionics, security equipment, or an industrial or home robot. According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of the present disclosure.

A bracelet-type wearable device having a flexible display according to the related art is wound in a single turn around a user's wrist or arm. This wearable device has, however, a smaller display size due to a single turn. In case of increasing the width of such a wearable device in order to obtain a larger display size, the usability of a wearable device is deteriorated due to a reduction in bendability.

FIG. 1 is a block diagram illustrating a mobile device according to an embodiment of the present disclosure.

Referring to FIG. 1, the mobile device 100 may include a flexible display unit 110, a sensor unit 120, and a control unit 130.

The flexible display unit 110 is a display unit formed of flexible material and thus adapted to be attached onto a portion of a user's body, such as wrist or arm, having curvature. Using characteristics of being bendable, the flexible display unit 110 may be wound in a spiral turn around a user's wrist or arm. When the flexible display unit 110 is wound in some turns, one longitudinal edge (hereinafter, also referred to as the first longitudinal edge) of the flexible display unit 110 may be disposed to closely face the other longitudinal edge (hereinafter, also referred to as the second longitudinal edge) in the next turn. Therefore, the flexible display unit 110 may create at least two display regions with respect to (e.g. at left and right sides from) a boundary between the first and second longitudinal edges facing each other. The flexible display unit 110 may be wound in at least one turn. The number of turns of the flexible display unit 110 may depend on the dimensions of a target (e.g., a user's wrist or arm) around which the flexible display unit 110 is wound.

The sensor unit 120 senses the above-mentioned boundary and determines an available display region. For example, the sensor unit 120 may be disposed at the first or second longitudinal edge of the flexible display unit 110 and sense whether the first and second longitudinal edges face each other and thereby form a boundary there between. Additionally, using an acceleration sensor, a gyro sensor, etc., the sensor unit 120 may determine any available display region (namely, to be used for a user) from among created display regions. In case the flexible display unit 110 is wound around a user's wrist or arm, a display region which is visible to a user is used, but a non-display region which is invisible to a user may be not used.

The control unit 130 controls the determined display region. Also, for an efficient use of electric power, the control unit 130 may block the supply of power to the non-display region which is disposed at an opposite side of the determined display region.

Figure 2:
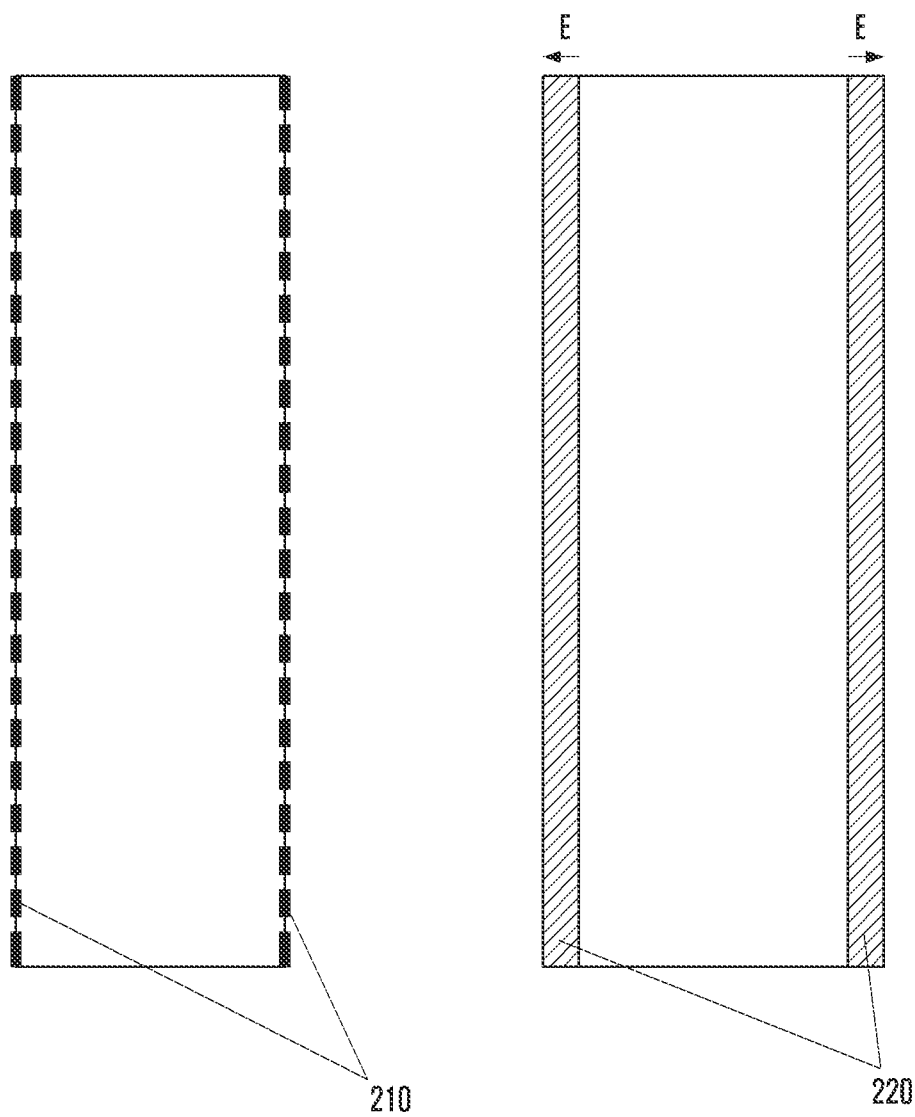
FIG. 2 is a schematic view illustrating a flexible display unit according to various embodiments of the present disclosure.

FIG. 2 is a schematic view illustrating a flexible display unit according to various embodiments of the present disclosure.

Referring to FIG. 2, the sensor unit 120 may be disposed at an edge part 210 of the flexible display unit 110. This edge part 210 may be the first or second longitudinal edge of the flexible display unit 110. The sensor unit 120 may sense whether the edge parts 210 face each other. When the flexible display unit 110 is wound in a spiral turn around a user's body, the first and second longitudinal edges of the flexible display unit 110 may be in a direct contact with each other or be separated from each other. In the latter case, the edge parts 210 in adjacent turns may face each other, being spaced about 1-2 mm apart. In various embodiments of the present disclosure, the sensor unit 120 may be formed of at least one of a magnet contact sensor, a capacitor sensor, a pressure sensor, and a button sensor.

Alternatively, an edge part 220 may be extended (represented as 'E' in FIG. 2) from the longitudinal edge of the flexible display unit 110. When the flexible display unit 110 is wound in a spiral turn around a user's body, the edge parts 220 in adjacent turns may be in a direct contact with each other or be separated from each other.

The control unit 130 may adjust a display mode of the flexible display unit 110, depending on a turn direction or display size recognized by the sensor unit 120.

Figure 3:
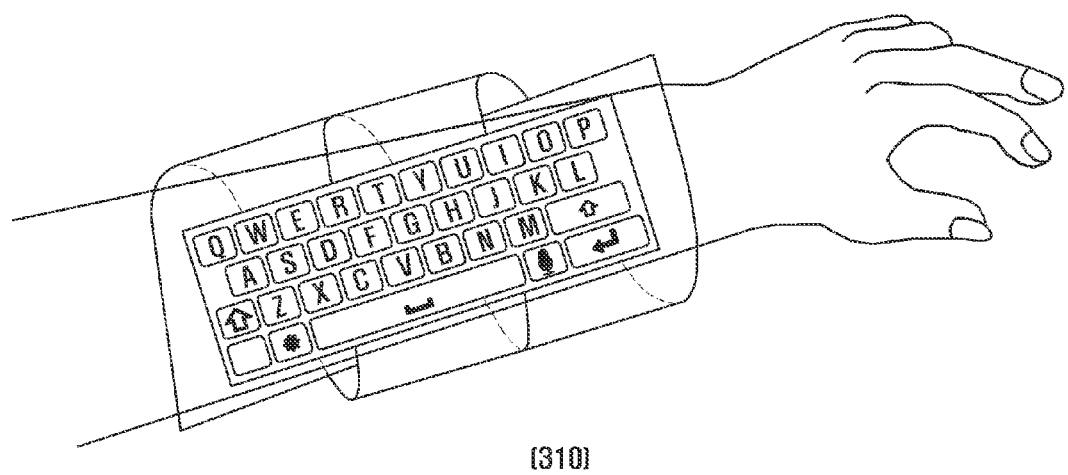
FIGS. 3, 4, and 5 illustrate examples of controlling a screen of a flexible display unit according to various embodiments of the present disclosure.
Figure 3:
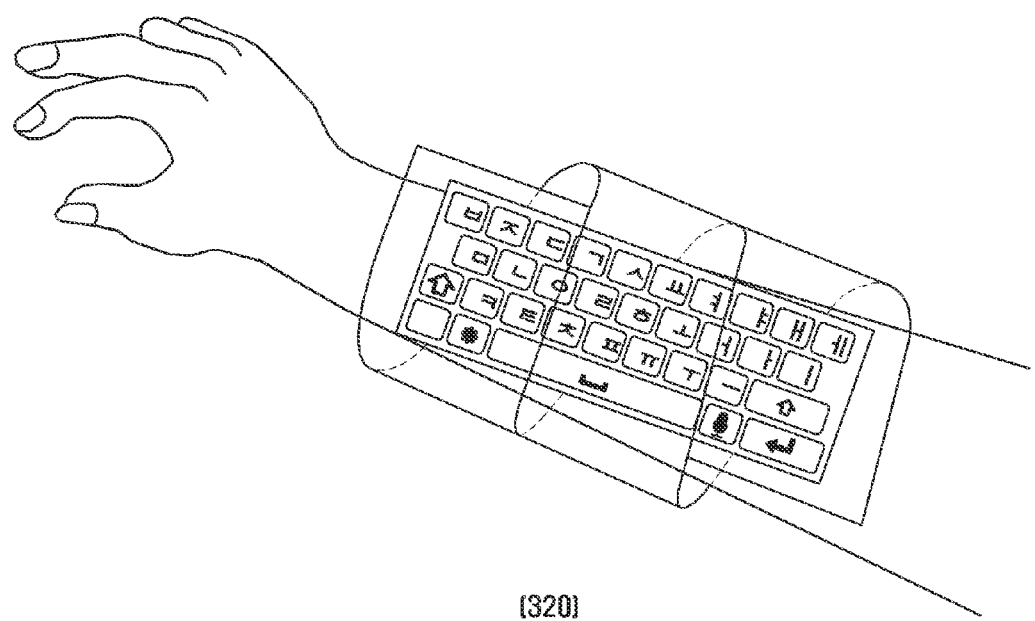
Figure 4:
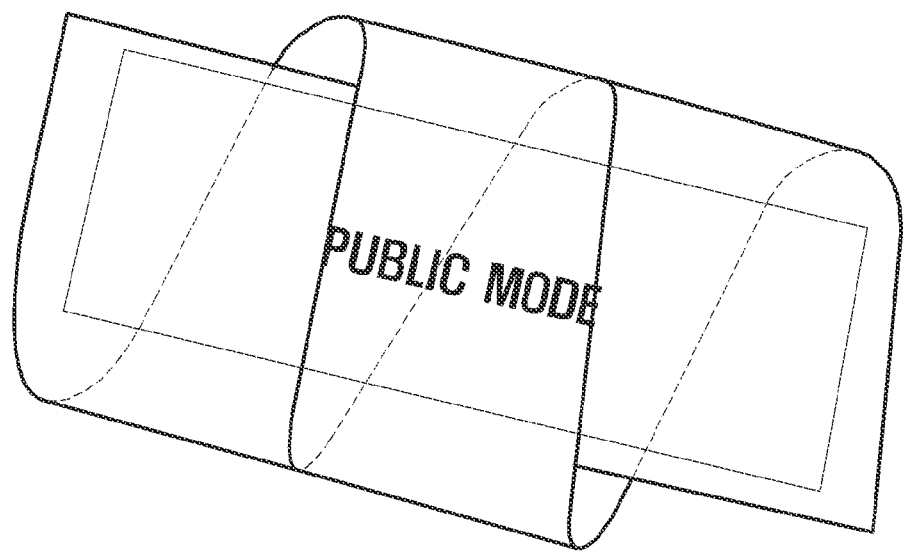
Figure 4:
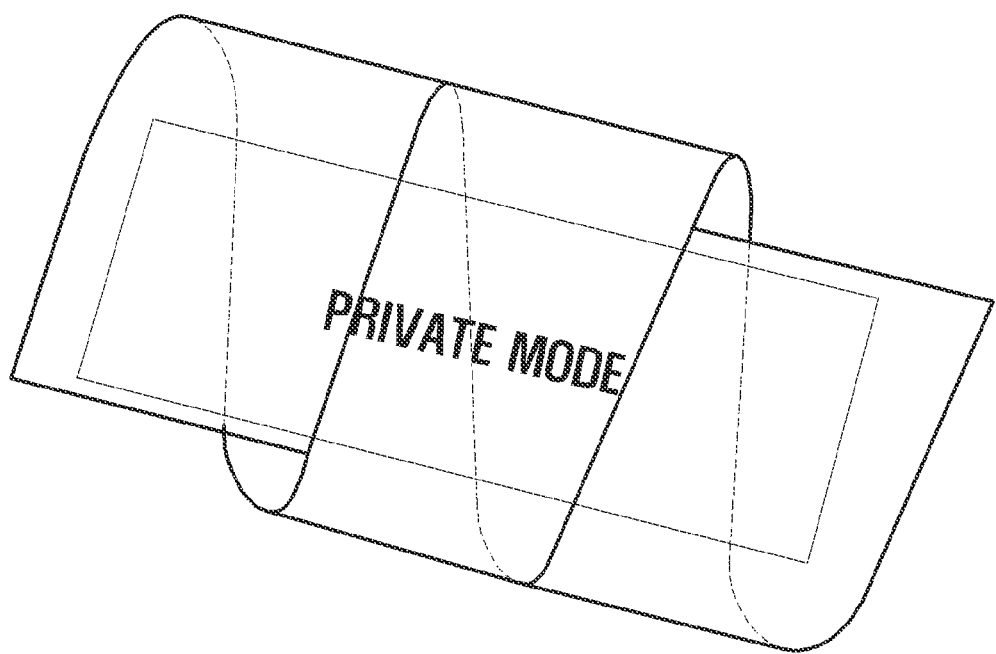
Figure 5:
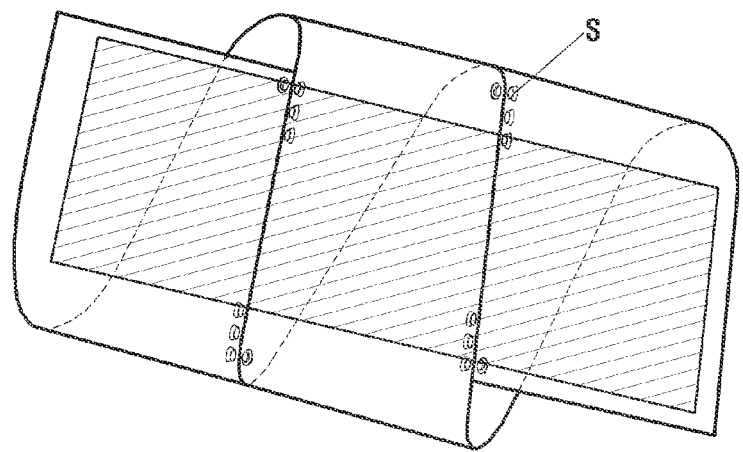
Figure 5:
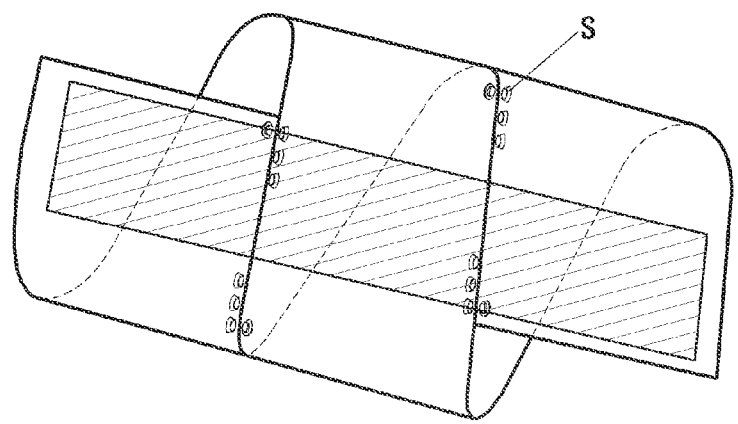
Figure 5:
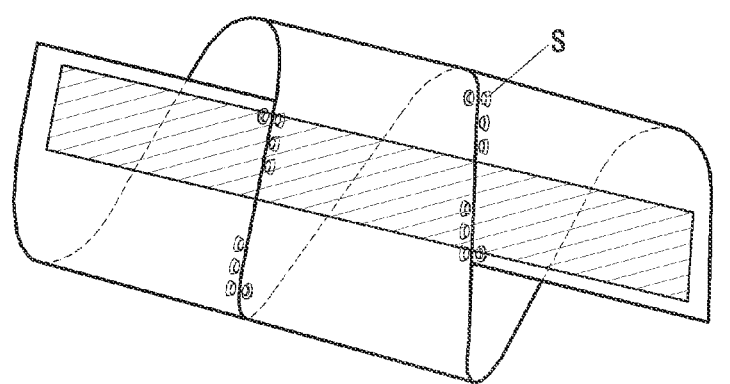

FIGS. 3, 4, and 5 illustrate examples of controlling a screen of a flexible display unit according to various embodiments of the present disclosure.

Referring to FIG. 3, the mobile device 100 may control a display mode of the flexible display unit 110 according to a turn direction of the flexible display unit 110 around a user's wrist or arm. The display mode refers to a particular definition about an operating system, a background screen, an input pad layout, etc. of the mobile device 100. For example, if the turn direction is counterclockwise, the control unit 130 may consider that a user wears the mobile device 100 on the left arm or wrist. Then, in view of an input direction, the control unit 130 may control the display mode of the flexible display unit 110 as a left mode 310. If the turn direction is clockwise, the control unit 130 may consider that a user wears the mobile device 100 on the right arm or wrist. Then, in view of an input direction, the control unit 130 may control the display mode of the flexible display unit 110 as a right mode 320. Depending on whether the display mode is the left mode 310 or the right mode 320, the control unit 130 may select a specific keypad layout to be displayed.

Referring to FIG. 4, the mobile device 100 may control a display mode of the flexible display unit 110 according to a turn direction of the flexible display unit 110 around a user's wrist or arm. This display mode may be a public mode 410 or a private mode 420. For example, if the turn direction is counterclockwise, the control unit 130 may consider that a user is an adult, and then control the display mode of the flexible display unit 110 as the public mode 410. If the turn direction is clockwise, the control unit 130 may consider that a user is a child, and then control the display mode of the flexible display unit 110 as the private mode 420. Depending on whether the display mode is the public mode 410 or the private mode 420, the control unit 130 may differently control an operating system or a background screen. Specifically, based on the operating system or the background screen determined depending on the display mode, the mobile device 100 may define, operate, or protect setting items or stored data thereof.

Referring to FIG. 5, since a turning scale of the flexible display unit 110 depends on the dimensions of a user's wrist or arm, the mobile device 100 may have different display sizes 510, 520 and 530. Therefore, the control unit 130 may detect substantially coincident points on the first and second longitudinal edges of the flexible display unit 110 through the sensor unit (S) disposed at such edges and then select one of the display sizes 510, 520 and 530. Further, based on the selected display size, the control unit 130 may adjust a display mode of the flexible display unit 110. For example, if the display size is determined as the first display size 510, the control unit 130 may regard a user as an adult and then control the display mode of the flexible display unit 110 as a public mode. If the display size is determined as the third display size 530, the control unit 130 may regard a user as a child and then control the display mode of the flexible display unit 110 as a private mode.

Figure 6:
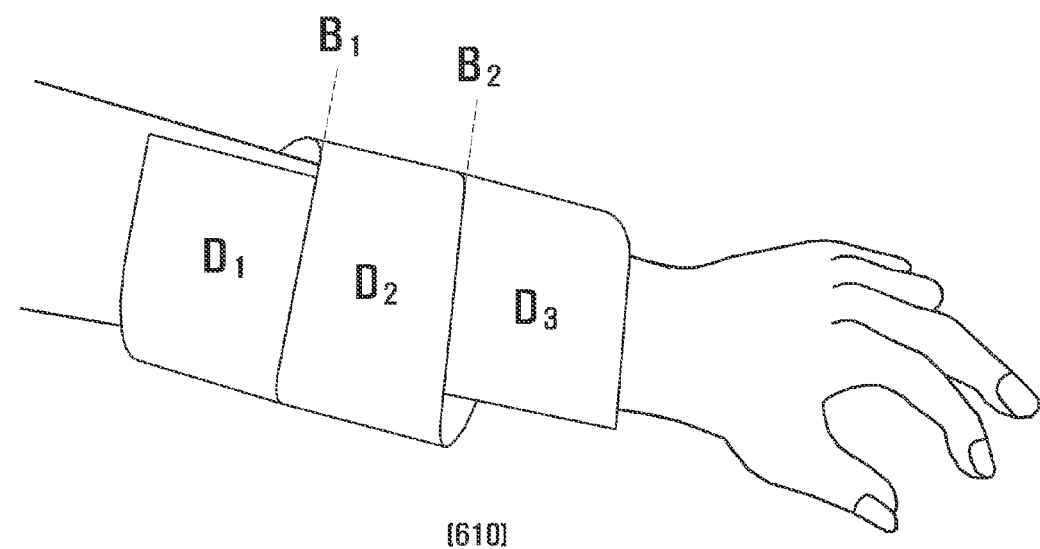
FIG. 6 illustrates examples of having a user wear a mobile device according to various embodiments of the present disclosure.
Figure 6:
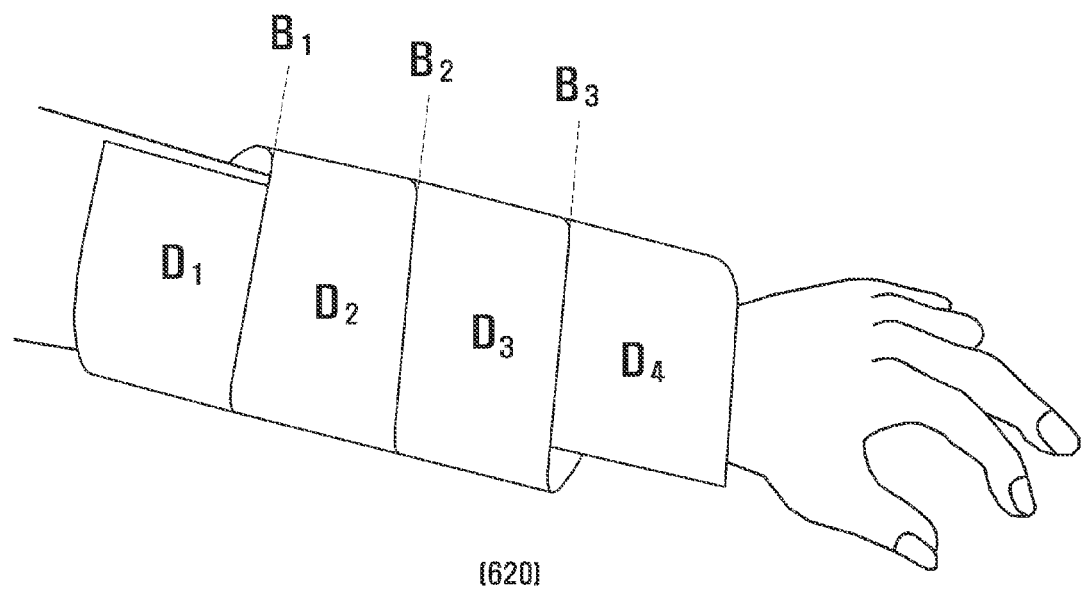

FIG. 6 illustrates examples of having a user wear a mobile device according to various embodiments of the present disclosure.

Referring to FIG. 6, in one example 610, the flexible display unit 110 may be wound in two spiral turns which produce two boundaries B1 and B2 between facing, adjacent longitudinal edges. In this example, three display regions D1, D2 and D3 are created on the basis of two boundaries B1 and B2. Similarly, in another example 620, the flexible display unit 110 may be wound in three spiral turns which produce three boundaries B1, B2 and B3 between facing, adjacent longitudinal edges. In this example, four display regions D1, D2, D3 and D4 are created on the basis of three boundaries B1, B2 and B3.

In case of such examples, the sensor unit 120 may sense boundaries and determine available display regions from among the created display regions. Then, based on the determined display regions, the control unit 130 may define input coordinate values.

Figure 7:
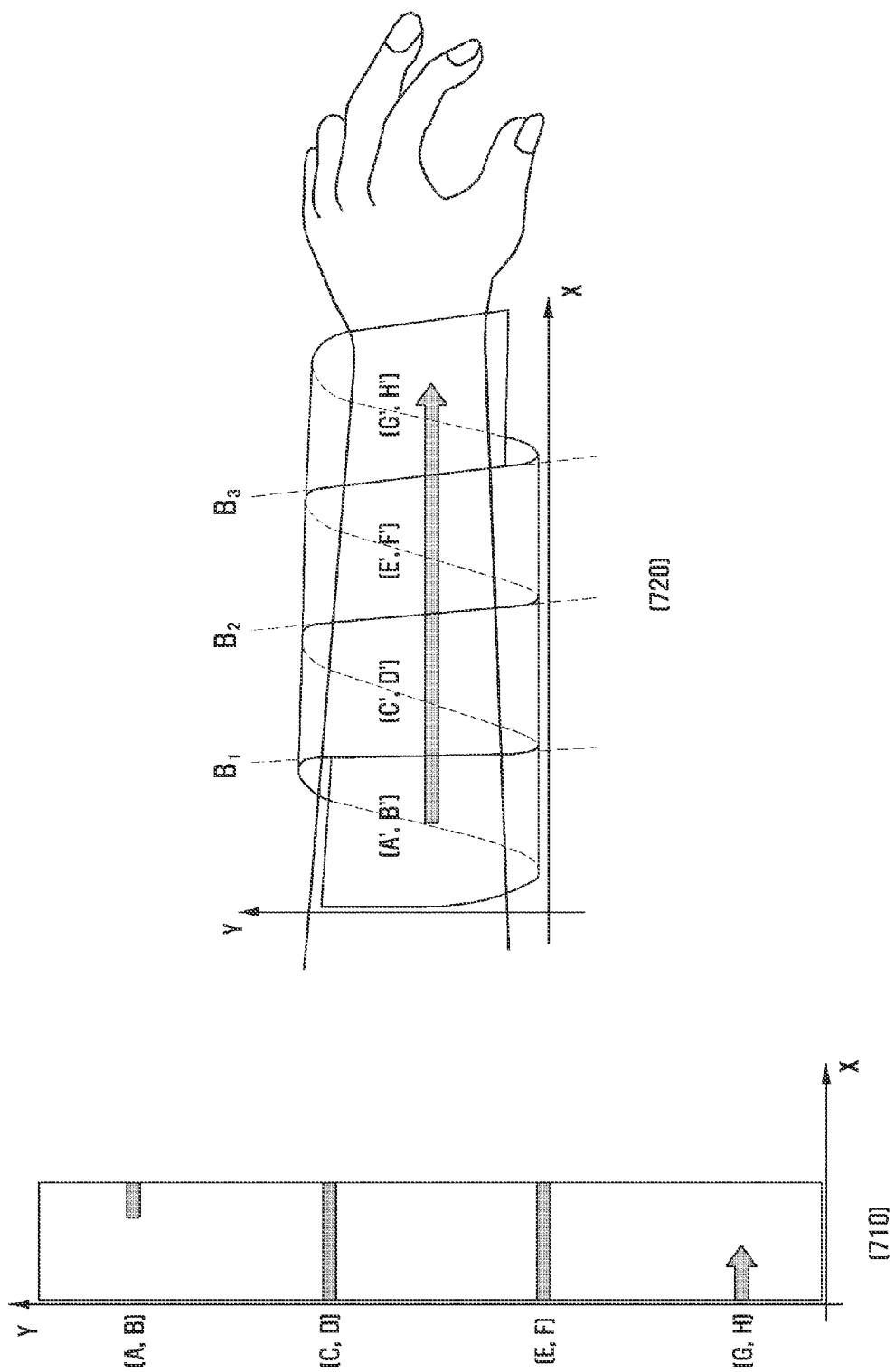
FIG. 7 illustrates an example of controlling a display region of a flexible display unit according to an embodiment of the present disclosure.

FIG. 7 illustrates an example of controlling a display region of a flexible display unit according to an embodiment of the present disclosure.

Referring to FIG. 7, before the flexible display unit 110 is wound around any target, the control unit 130 may define initial coordinate values on the flexible display unit 110 which is disposed vertically in two perpendicular axes called x-axis and y-axis as indicated by a reference numeral 710. Thereafter, when the flexible display unit 110 is wound in spiral turns as indicated by a reference numeral 720, the sensor unit 120 may sense boundaries B1, B2 and B3 produced between the facing, adjacent longitudinal edges of the flexible display unit 110. Further, depending on display regions created on the basis of the boundaries B1, B2 and B3, the control unit 130 may newly define input coordinate values. For example, the control unit 130 may define the first input coordinate value (A', B') corresponding to the first display region, the second input coordinate value (C', D') corresponding to the second display region, the third input coordinate value (E', F') corresponding to the third display region, and the fourth input coordinate value (G', H') corresponding to the fourth display region.

Meanwhile, the control unit 130 may control such display regions in response to a user's touch input.

Figure 8:
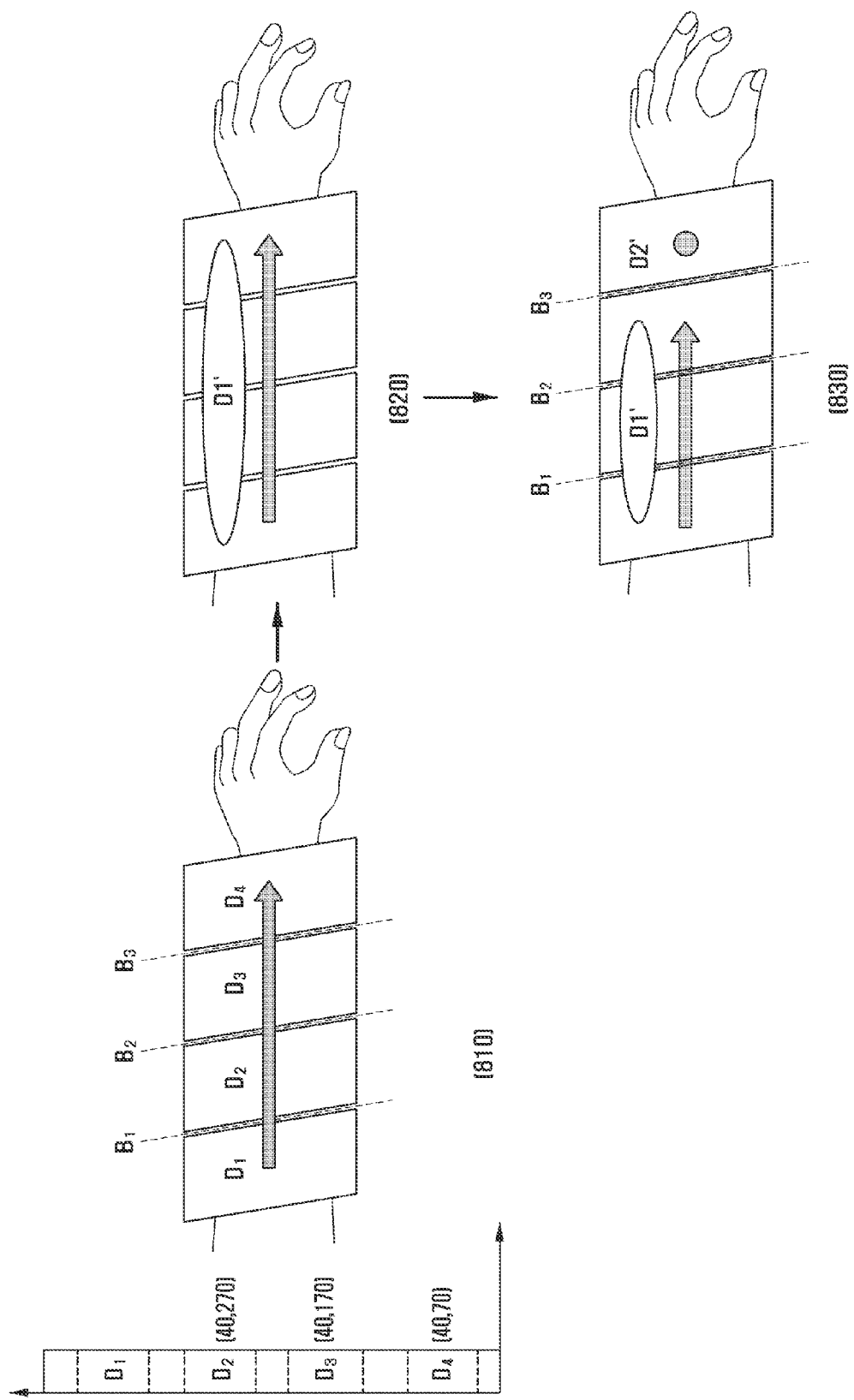
FIG. 8 illustrates examples of controlling the display region in response to a user's touch input according to various embodiments of the present disclosure.

FIG. 8 illustrates examples of controlling a display region in response to a user's touch input according to various embodiments of the present disclosure.

Referring to FIG. 8, as indicated by a reference numeral 810, the flexible display unit 110 may create four display regions D1, D2, D3 and D4 on the basis of three boundaries B1, B2 and B3 produced between facing, adjacent longitudinal edges. Hereinafter, it is supposed that these created display regions are determined as available display regions by the sensor unit 120. In an embodiment of the present disclosure, if the display regions D1, D2, D3 and D4 are continuously touched as indicated by a reference numeral 810, the control unit 130 may control such display regions as a single display region D1' as indicated by a reference numeral 820. For example, if a user's touch input starts from the first display region D1 and terminates at the fourth display region D4, the control unit 130 may recognize this touch input as a continuous touch input along the display regions D1, D2, D3 and D4 and then control these display regions as a single display region D1'.

In an embodiment of the present disclosure, if the display regions are discontinuously touched as indicated by a reference numeral 830, the control unit 130 may individually control the respective display regions. For example, if a user's touch input starts from the first display region D1 and terminates at the third display region D3, and then if a separate user's touch input is made on the fourth display region D4, the control unit 130 may recognize the former touch input along three display regions D1, D2 and D3 as a continuous touch input and also recognize the latter touch input on the fourth display region D4 as a discontinuous touch input. Therefore, the control unit 130 may control three display regions D1, D2 and D3 as a single display region D1' and also control the fourth display region D4 as another single display region D2'.

In an embodiment of the present disclosure, if a user's touch input starts from the first display region D1 and terminates at the second display region D2, and then if a separate user's touch input starts from the third display region D3 and terminates at the fourth display region D4, the control unit 130 may recognize a touch input between the first and second display regions D1 and D2 as a continuous touch input, a touch input between the second and third display regions D2 and D3 as a discontinuous touch input, and a touch input between the third and fourth display regions D3 and D4 as a continuous touch input. Therefore, the control unit 130 may control the first and second display regions D1 and D2 as a single display region D1' and also control the third and fourth display regions D3 and D4 as another single display region D2'.

Meanwhile, the control unit 130 may provide windows corresponding to the display regions, respectively, and then individually control each window.

FIGS. 9A, 9B, 9C, and 9D illustrate various examples of controlling a display region according to various embodiments of the present disclosure.

Figure 9A:
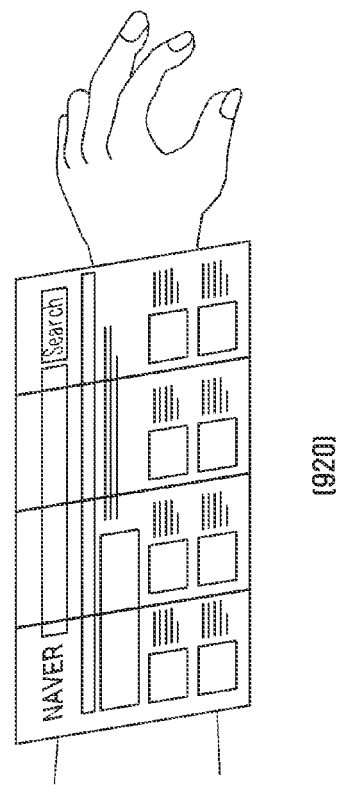
FIGS. 9A, 9B, 9C, and 9D illustrate various examples of controlling a display region according to various embodiments of the present disclosure.
Figure 9A:
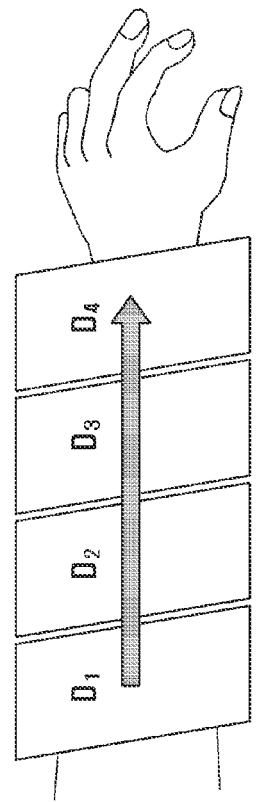

Referring to FIG. 9A, in case there is a continuous touch input along the display regions D1, D2, D3 and D4, the control unit 130 may control these display regions as a single display region D1' as indicated by a reference numeral 910. For example, as indicated by a reference numeral 920, the control unit 130 may provide a single window to this single display region D1' and then execute a webpage on the window in response to a user's selection.

Figure 9B:
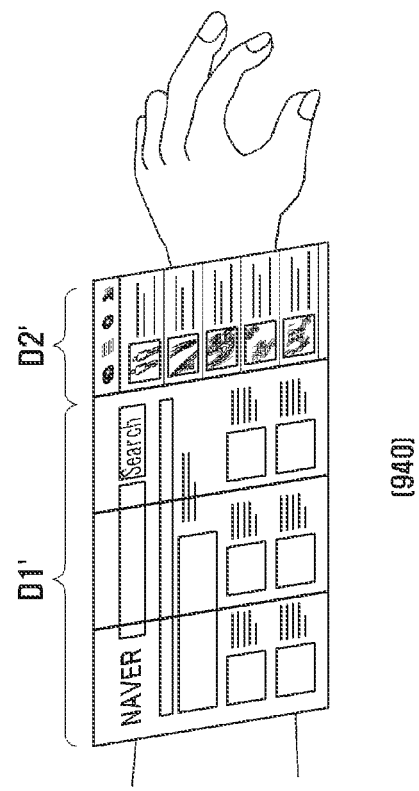
Figure 9B:
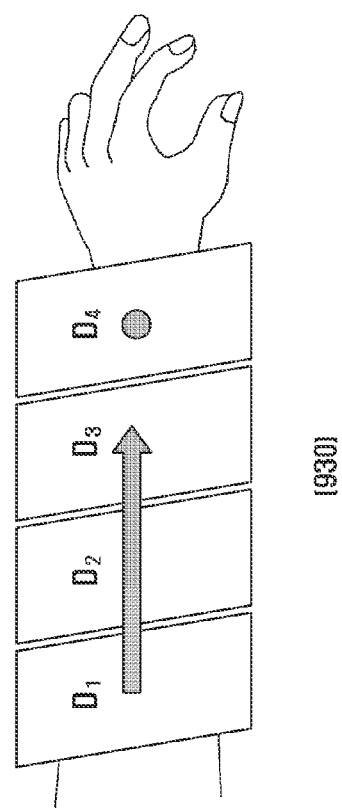

Referring to FIG. 9B, in response to user's touch inputs as indicated by a reference numeral 930, the control unit 130 may control three display regions D1, D2 and D3 as a single display region D1' and also control the fourth display region D4 as another single display region D2'. For example, as indicated by a reference numeral 940, the control unit 130 may provide the first window to the former single display region D1' and also provide the second window to the latter single display region D2'. Then, in response to a user's selection, the control unit 130 may execute a webpage on the first window and also play a music file on the second window. In this case, setting values of the mobile device 100, such as screen brightness, volume, etc., may be equally or differently applied to the first and second windows.

Figure 9C:
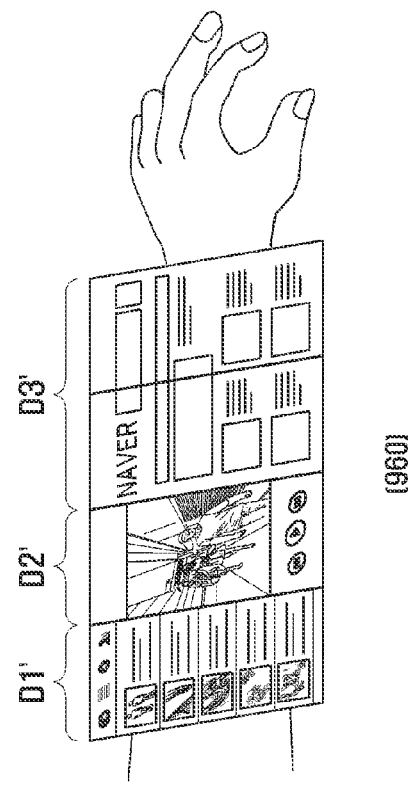
Figure 9C:
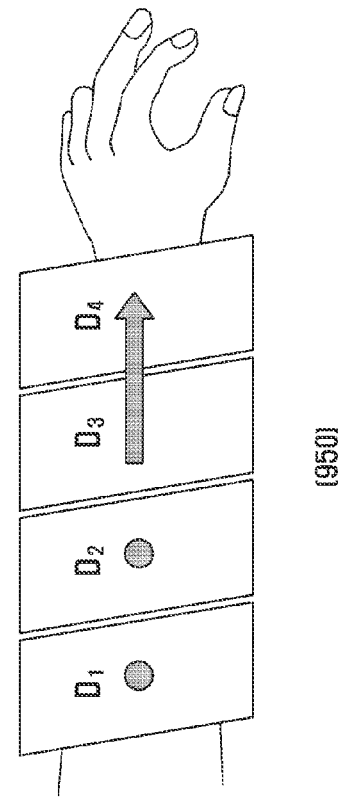

Referring to FIG. 9C, in response to user's touch inputs as indicated by a reference numeral 950, the control unit 130 may control the first and second display regions D1 and D2 as individual single display regions D1' and D2' and also control the third and fourth display regions D3 and D4 as another single display region D3'. For example, as indicated by a reference numeral 960, the control unit 130 may provide a window to each of such single display regions D1', D2' and D3'. Then, in response to a user's selection, the control unit 130 may play a music file on the first window, play a video file on the second window, and execute a webpage on the third window. In this case, setting values of the mobile device 100, such as screen brightness, volume, etc., may be equally or differently applied to the first, second and third windows.

Figure 9D:
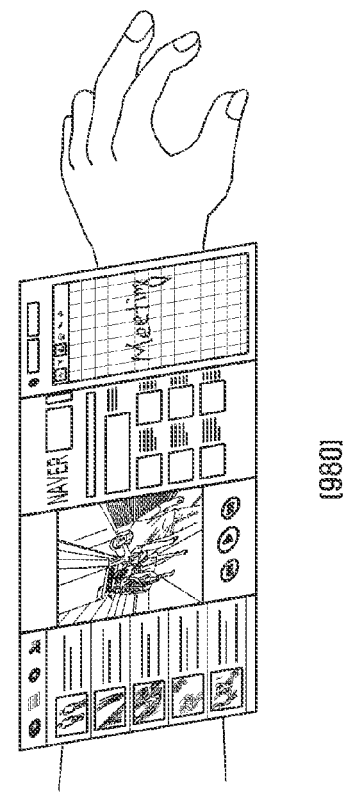
Figure 9D:
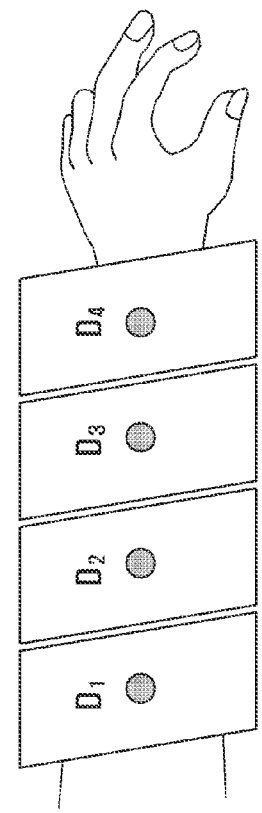

Referring to FIG. 9D, in response to user's touch inputs as indicated by a reference numeral 970, the control unit 130 may control four display regions D1, D2, D3 and D4 as individual single display regions D1', D2', D3' and D4'. For example, as indicated by a reference numeral 980, the control unit 130 may provide a window to each of such single display regions D1', D2', D3' and D4'. Then, in response to a user's selection, the control unit 130 may play a music file on the first window, play a video file on the second window, execute a webpage on the third window, and execute a note program on the fourth window. In this case, setting values of the mobile device 100, such as screen brightness, volume, etc., may be equally or differently applied to the first, second, third and fourth windows.

Figure 10:
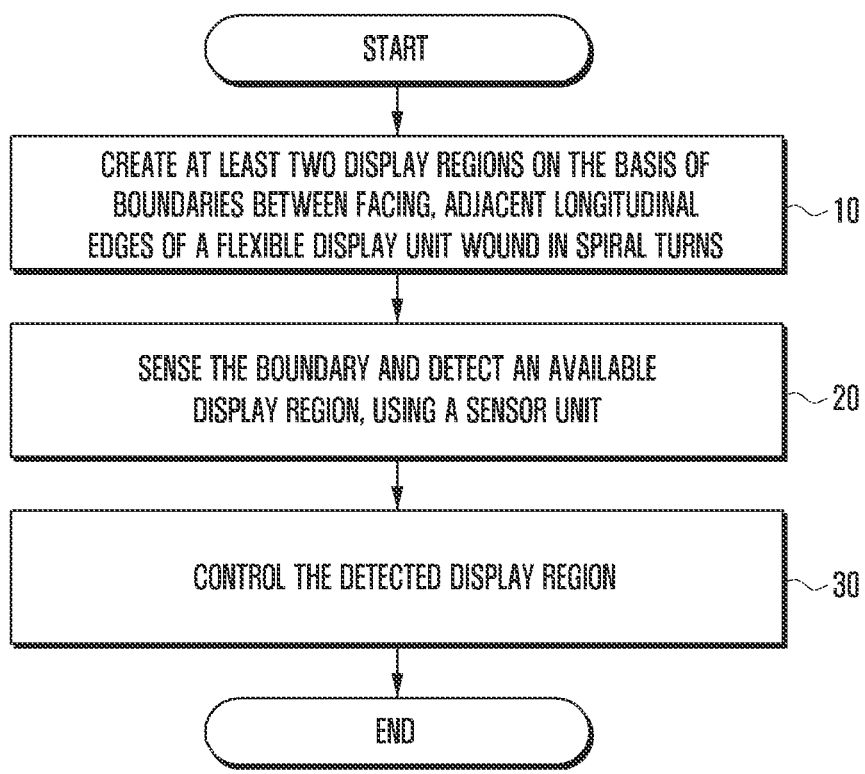
FIG. 10 is a flow diagram illustrating a method for controlling a mobile device according to an embodiment of the present disclosure.

FIG. 10 is a flow diagram illustrating a method for controlling a mobile device according to an embodiment of the present disclosure. The control method of the present disclosure may be executed in the mobile device 100 shown in FIG. 1 and discussed above.

Referring to FIG. 10, at operation 10, the flexible display unit 110 of the mobile device 100 is wound in spiral turns and creates at least two display regions on the basis of boundaries between facing, adjacent longitudinal edges. The flexible display unit 110 formed of flexible material may be wound in spiral turns around a user's wrist or arm, using characteristics of being bendable. When the flexible display unit 110 having the first and second longitudinal edges is wound in two or more turns, the first longitudinal edge in a certain turn may be disposed to closely face the second longitudinal edge in the next turn, producing a boundary between the first and second edges. Therefore, the flexible display unit 110 may create two display regions at left and right sides from each boundary.

At operation 20, the sensor unit 120 of the mobile device 100 senses the boundary and determines an available display region. In an embodiment of the present disclosure, the sensor unit 120 may be disposed at the first or second longitudinal edge of the flexible display unit 110 and sense whether the first and second longitudinal edges face each other and thereby form a boundary therebetween. The sensor unit 120 may be formed of at least one of a magnet contact sensor, a capacitor sensor, a pressure sensor, and a button sensor. In an embodiment of the present disclosure, the first and second longitudinal edges may be extended in a width direction of the flexible display unit 110 as discussed above and shown in FIG. 2.

Additionally, using an acceleration sensor, a gyro sensor, etc., the sensor unit 120 may determine any available display region (namely, to be used for a user) from among created display regions. When the flexible display unit 110 is wound around a user's wrist or arm, a display region which is visible to a user is used, but a non-display region which is invisible to a user may be not used. In this case, for an efficient use of electric power, the control unit 130 may block the supply of power to the non-display region which is disposed at an opposite side of the determined display region.

At operation 30, the control unit 130 of the mobile device 100 controls the determined display region. In an embodiment of the present disclosure, the control unit 130 may adjust a display mode of the flexible display unit 110, depending on a turn direction or display size recognized by the sensor unit 120. In an embodiment of the present disclosure, the control unit 130 may define, based on the display region to be controlled, input coordinate values.

In an embodiment of the present disclosure, the control unit 130 may control such display regions in response to a user's touch input. For example, in case the display regions are continuously touched, the control unit 130 may control the display regions as a single display region. Alternatively, in case the display regions are discontinuously touched, the control unit 130 may individually control the respective display regions. In this case, the control unit 130 may provide windows corresponding to the display regions, respectively, and then individually control each window. Namely, setting values of the mobile device 100, such as screen brightness, volume, etc., may be equally or differently applied to the respective windows.

According to various embodiments of the present disclosure, a spiral turn of the flexible display unit may increase a display size without any deterioration of usability.

Additionally, according to various embodiments of the present disclosure, an efficient use of electric power may be allowed by blocking the supply of power to the non-display region which is disposed at an opposite side of the determined display region.

Various aspects of the present disclosure may also be embodied as computer readable code on a non-transitory computer readable recording medium. A non-transitory computer readable recording medium is any data storage device that may store data which may be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium may also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums may also be distributed over network coupled computer systems so that the instructions are stored and executed in a distributed fashion. Also, functional computer programs, instructions, and instruction segments for accomplishing the present disclosure may be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a flexible display having a first longitudinal edge and a second longitudinal edge;
at least two sensors being disposed on each of the first longitudinal edge and the second longitudinal edge and being configured to sense at least one boundary which is formed while the first longitudinal edge and the second longitudinal edge face each other according to the electronic device being wound in spiral turns; and
a controller configured to;
identify at least two display regions of the flexible display based on the number of sensed boundaries, and
control the flexible display to operate as at least one display based on the number of identified display regions.

2. The electronic device of claim 1, wherein the at least one sensor is further configured to sense whether the first longitudinal edge and the second longitudinal edge face each other.

3. The electronic device of claim 1, wherein the controller is further configured to adjust a display mode of the flexible display, depending on one of a turn direction and a display size recognized by the at least one sensor.

4. The electronic device of claim 1,
wherein at least one of the first longitudinal edge and the second longitudinal edge is extended in a width direction of the flexible display, and
wherein the at least one sensor is further configured to sense whether the extended first longitudinal edge and the second longitudinal edge face each other.

5. The electronic device of claim 1, wherein the controller is further configured to block a supply of power to a non-display region which is disposed at an opposite side of the determined display region.

6. The electronic device of claim 1,
wherein the at least two display regions comprise a first display region and a second display region, and
wherein the controller is further configured to control the first display region and the second display region to operate as the at least one display in response to a touch input.

7. The electronic device of claim 6, wherein the controller is further configured to control the first display region and the second display region to operate as a single display in response to a touch input crossing a boundary between the first display region and the second display region.

8. The electronic device of claim 6, wherein the controller is further configured to control the first display region and the second region to operate as two separate displays in response to touch input respectively input on the first display region and the second display region.

9. The electronic device of claim 6, wherein the controller is further configured to provide windows corresponding to the at least two display regions, respectively, and to individually control each window.

10. A method for controlling an electronic device, the method comprising:
sensing, by at least two sensors being disposed on each of the first longitudinal edge and a second longitudinal edge of a flexible display, at least one boundary which is formed while the first longitudinal edge and the second longitudinal edge face each other according to an electronic device being wound in spiral turns;
identifying, by a controller, at least two display regions of the flexible display based on the number of sensed boundaries; and
controlling, by the controller, the flexible display to operate as at least one display based on the number of identified display regions.

11. The method of claim 10,
wherein the sensing of the at least one boundary includes sensing whether the first longitudinal edge and the second longitudinal edge face each other.

12. The method of claim 10, wherein the controlling of the flexible display further comprises adjusting a display mode of the flexible display, depending on one of a turn direction and a display size recognized by the at least two sensors.

13. The method of claim 10,
wherein at least one of the first longitudinal edge and the second longitudinal edge is extended in a width direction of the flexible display, and
wherein the sensing of the at least one boundary includes sensing whether the extended first longitudinal edge and the second longitudinal edge face each other.

14. The method of claim 10,
wherein the at least two display regions comprise a first display region and a second display region, and
wherein the controlling of the flexible display includes controlling the first display region and the second display region to operate at least one display in response to a touch input.

15. The method of claim 14, wherein the controlling of the flexible display in response to the touch input includes controlling the first display region and the second display region to operate as a single display in response to a touch input crossing a boundary between the first display region and the second display region.

16. The method of claim 14, wherein the controlling of the flexible display in response to the touch input includes controlling the first display region and the second display region to operate as two separate displays in response to a touch input respectively input on the first display region and the second display region.

17. The method of claim 16, wherein the controlling of the first display region and the second display region includes:
providing windows corresponding to the first display region and the second display region, respectively; and
individually controlling each window.

18. The method of claim 14, wherein the controlling of the flexible display in response to the touch input includes blocking a supply of power to a non-display region which is disposed at an opposite side of the determined display region.

* * * * *